United States Patent [19]
Cipolla et al.

[11] Patent Number: 5,791,754
[45] Date of Patent: Aug. 11, 1998

[54] COMPACT DESKTOP PROJECTION DISPLAY USING THREE MIRRORS

[75] Inventors: Thomas Mario Cipolla; Fuad Elias Doany, both of Katonah, N.Y.; Rama Nand Singh, Bethel, Conn.

[73] Assignee: International Business Machines Corporation, Armonk, N.Y.

[21] Appl. No.: 783,252

[22] Filed: Jan. 14, 1997

[51] Int. Cl.$^6$ .................................................. G03B 21/14
[52] U.S. Cl. ..................... 353/78; 353/99; 353/119
[58] Field of Search ....................... 353/78, 77, 76, 353/75, 74, 99, 119

[56] References Cited

U.S. PATENT DOCUMENTS

| | | | |
|---|---|---|---|
| 3,733,121 | 5/1973 | Smitzer | 353/78 |
| 4,185,901 | 1/1980 | Behr | 353/78 |
| 4,257,694 | 3/1981 | Reinhard | 353/78 |
| 4,334,742 | 6/1982 | Link | 353/78 |
| 4,385,313 | 5/1983 | Slater et al. | |
| 4,578,710 | 3/1986 | Hasegawa | 353/77 |
| 4,941,732 | 7/1990 | Umeda et al. | 353/78 |
| 4,963,016 | 10/1990 | Heijuemans et al. | 353/78 |
| 5,048,949 | 9/1991 | Sato et al. | 353/77 |
| 5,223,869 | 6/1993 | Yanagi | 353/78 |
| 5,278,595 | 1/1994 | Nishida et al. | 353/78 |
| 5,289,287 | 2/1994 | Dargis et al. | 353/71 |
| 5,467,154 | 11/1995 | Gale et al. | 353/77 |
| 5,491,585 | 2/1996 | Dolgoff | 353/78 |
| 5,499,067 | 3/1996 | Shibazaki | 353/78 |
| 5,580,146 | 12/1996 | Maslow | 353/77 |

FOREIGN PATENT DOCUMENTS 0383038  4/1991  Japan ........................... 353/74

OTHER PUBLICATIONS

Shinozaki et al. "A 50–in Ultra–Slim Liquid–Crystal Rear Projector", Society for Information Display International Symposium, Digest of Technical Papers, vol. XIII, 1992, pp. 273–276. No Month.

*Primary Examiner*—William Dowling
*Attorney, Agent, or Firm*—Scully, Scott, Murphy & Presser

[57] ABSTRACT

An apparatus for displaying an image on a screen is disclosed. The display has a projection lens for projecting the image; a first reflective surface for receiving the projected image and reflecting a first reflected image having a first central optical axis; and a second reflective surface for receiving the first reflected image and reflecting a second reflected image having a second central optical axis onto said screen. The first and second reflective surfaces provide a folded projection path, wherein the first and second central optical axes are in the same plane. Alternatively, the first and second central optical axes do not lie in a common plane. This further reduces the size of the displaying apparatus. A third reflective surface is also provided to further reduce the size of the display. The two or three reflective surfaces or mirrors are enclosed in an environmentally sealed compartment. The projection lens has a reduced illumination angle and an increased lens-to-screen distance.

24 Claims, 5 Drawing Sheets

COMPACT DESKTOP PROJECTION DISPLAY USING THREE MIRRORS

BACKGROUND OF THE INVENTION

1. Field of the Invention

The present invention is directed to a desktop projection display, such as a liquid crystal projection display, and more particularly, to a compact desktop projection display using liquid crystal micro displays and folding mirrors to reduce a dimension thereof.

2. Discussion of the Prior Art

Portable computers and high definition television sets require high quality displays, such as liquid crystal displays and projections displays. The main advantage of a projection display, besides its resolution, is that it can be lightweight and slim compared to a cathode ray tube (CRT) display.

In conventional compact projection displays of desktop computers, for example, the size of the display monitor is reduced by folding the optical path from the projection lens to the screen using plane mirrors. In addition, a wide-angle projection lens is typically used to minimize the lens to screen distance.

FIG. 1 shows a conventional folded liquid crystal (LC) projection display 10. The projection display 10 includes an arc lamp 12 having a parabolic reflector 14. The lamp 12 provides illumination to three reflective liquid crystal light valves 16, 18, 20 through a condenser lens 22, a polarizing beam splitter (PBS) 24, and a prism assembly 26. The prism assembly 26 includes three dichroic prisms 28, 30, 32, for separating light into desired colors, e.g., red, green and blue, and directing each color component to a respective one of the light valves 16, 18, 20.

Upon reflection from the light valves 16, 18, 20, the color component are recombined by the prism assembly 26 to form a desired image. A wide angle projection lens 40 projects the desired image onto a screen 42 through a single folding mirror 44. The mirror 44 allows reduction in the size of the projection display 10 while maintaining the required lens 40 to screen 42 distance. For proper image display, using the required lens to screen distance in the compact display 10, the projection lens 40 has a wide illumination angle $\alpha$ (FIGS. 2–3). Such a lens is often referred to as a wide angle lens.

FIG. 2 shows the path of projected light between the projection lens 40, shown as a point source, and the screen 42. The projected image, shown as a pair of arrows 50, 52, emanates from the projection lens 40 and reflects off the mirror 44 onto the screen 42. A central optical axis of the projected image is shown as dashed lines 54 and has a length $l_1$ while the central axis of the image reflected from the mirror 44 toward the screen 42 is shown as dashed lines 56 and has a length $l_2$.

The actual image projected from the projection lens 40 has a virtual image at a point 58, which is a distance $l_1+l_2$ away from the screen 42. As seen from FIG. 2, using the mirror 44 reduces the depth or thickness of the display from a distance slightly larger than $l_1+l_2$, to a distance which is slightly larger than $l_2$.

The intensity of the displayed image at the edge $x_2$ of the screen 42 is less than the intensity at the center $x_1$ of the screen 42. This is because the distance d from the screen edge $x_2$ to the actual image source 40, or the virtual image source 58, is larger than the distance $l_1+l_2$ between the screen center $x_1$ and the image source; i.e., $d > l_1+l_2$.

FIG. 3 shows the effect of reducing the depth or thickness of the display, while maintaining the same screen width and length, by reducing the distance $l_1+l_2$ of the image central optical axis. The dashed arc 60 in FIG. 3 represents uniform intensity light. As seen from FIG. 3, for a large source to screen distance $l_1+l_2$, the screen edge $x_2$ is at a distance d, which is larger than $l_1+l_2$ by a distance r. That is, $d=r+l_1+l_2$, where $l_1+l_2$ is distance between the source 58 and screen center $x_1$. $l_1+l_2$ is also the radius of the dashed arc 60. The maximum screen or corner illumination angle is shown as $\alpha$.

FIG. 3 also shows a dashed circle 60' of constant light intensity for a source 58 to screen 42' distance of $l_1'+l_2'$, which is also the radius of the dashed circle 60'. Note, the distance $l_1'+l_2'$ is smaller than the distance $l_1+l_2$ to the far screen 42. If the height h of the screen 42 is kept constant, then, as the far screen 42 approaches the near screen 42', the ratio of $d/l_1+l_2$ increases. In addition, $x_2$ becomes further away from the constant intensity light circle and becomes a larger percentage of $x_1$. Moreover, the illumination angle $\alpha$ increases to $\alpha'$. That is, $$d'l_1'+l_2' > d/l_1+l_2$$

$$r' > r$$

$$\alpha' > \alpha$$

Because r' is larger than r, where $x_2'$ is further from the constant intensity circle 60' than $x_2$ is from the arc 60, the ratio of the intensity at the screen edge to the intensity at the screen center decreases as the illumination angle increases. Since the near screen illumination angle $\alpha'$ is larger than the far screen illumination angle $\alpha$, the ratio of the intensity at the near screen edge $x_2'$ to the intensity at the near screen center $x_1'$ is less than the edge to center intensities ratio for the far screen 42. Thus, as the thickness of the display is reduced, a large difference in light intensity or illumination occurs between the screen center and edges. This is shown in FIG. 3 where the distance r' between the circle 60' and near screen edge $x_2^1$ is larger than the distance r between the arc 60 and far screen edge $x_2$.

As described, the use of a wide-angle projection lens 40, having a large screen illumination angle, to achieve the compact display size is accompanied by a vast difference in the illumination from the center to the edge of the screen 42. This severe non-uniformity in screen illumination is a big technical flaw for desk-top projection displays. Typical desktop projection displays cannot achieve both screen uniformity and compactness and must therefore trade-off between image uniformity and display compactness. In addition, the wide angle nature of the lens, and the relatively short lens-to-screen distance, introduce greater complexity and cost in the lens design and fabrication.

SUMMARY OF THE INVENTION

The object of the present invention is to provide a display that eliminates the problems of conventional displays.

Another object of the present invention is to provide a display which is both compact and has uniform screen illumination.

Yet another object of the present invention is to provide a display that does not require a wide angle projection lens, thus reducing intensity variations of an image displayed on the screen.

A further object of the present invention is to provide a display with a simple projection lens having a long lens-to-screen distance, instead of a complex projection lens having a short lens-to-screen distance.

These and other objects of the present invention are achieved by an apparatus for displaying an image on a screen, such as a liquid crystal display projection apparatus, comprising a projection lens for projecting the image; a first reflective surface for receiving the projected image and reflecting a first reflected image having a first central optical axis; and a second reflective surface for receiving the first reflected image and reflecting a second reflected image having a second central optical axis onto the screen. The first and second reflective surfaces provide a folded projection path, wherein the first and second central optical axes are in the same plane.

In another embodiment of the present invention, the first and second central optical axes do not lie in a common plane. This further reduces the size of the displaying apparatus.

In yet another embodiment, a third reflective surface is provided to further reduce the size of the displaying apparatus. The reflective surfaces are folding mirrors, for example, and are tilted in one dimension. Alternatively, the mirrors are skewed relative to each other.

In a further embodiment, the two or three reflective surfaces or mirrors are enclosed in an environmentally sealed compartment. The projection lens has a reduced illumination angle and an increased lens-to-screen distance. Illustratively, the projection lens has an illumination angle which is less than 18°, and has a lens-to-screen distance of approximately from 800 mm to 900 mm for a display depth of approximately 10 inches and a screen diagonal of approximately 20 inches.

The arrangement of the folding mirrors reduces the depth of the display to approximately less than one-half the screen diagonal, for a screen having an aspect ratio of approximately 4 by 3.

A further aspect of the present invention includes an environmentally sealed optical compartment having an inlet and an outlet comprising a first reflective surface for receiving a projected image from the inlet and reflecting a first reflected image; and a second reflective surface for receiving the first reflected image and reflecting a second reflected image onto the outlet. The first and second reflective surfaces provide a folded projection path so that an intensity of the second reflected image is substantially uniform from edges to a center of the outlet.

In the environmentally sealed optical compartment, the central optical axes of the first and second reflected images are in a single plane. Alternatively, the central optical axes are not in a common plane. The first and second reflective surfaces are tilted in one dimension, or are skewed relative to each other. Illustratively, the first and second reflective surfaces are folding mirrors.

BRIEF DESCRIPTION OF THE DRAWINGS

Further features and advantages of the invention will become more read y apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

A projection display according to the present invention has an optical arrangement using multiple folding mirrors in the projection path that results in both compactness and uniform screen illumination. Illustratively, the display is a liquid display projection apparatus and is used for projection display applications, such as computer monitors and high definition televisions. In particular, if three skewed folding mirrors are used, a compact display is achieved which, in addition to compactness, also provides a larger lens to screen distance than conventional displays.

This large distance reduces the angular field coverage needed from a projection lens, thereby reducing the variation in the illumination on the edges and center of the screen. This alleviates the need to use a wide angle projection lens, thus preventing detrimental effects thereof, which include variation in image intensity between the center and edges of the screen and increased cost. Furthermore, the inherently longer distance of the projection lens of the inventive display eliminates the need to design difficult and complex lenses having short lens-to-screen distances that are otherwise required for desk-top applications of projection displays.

For typical computer monitor or screen formats of approximately 4×3 aspect ratio, where aspect ratio is the length to width ratio of the display, the optical arrangement of the inventive display achieves a depth of approximately less than one-half the screen diagonal.

Figure 4:
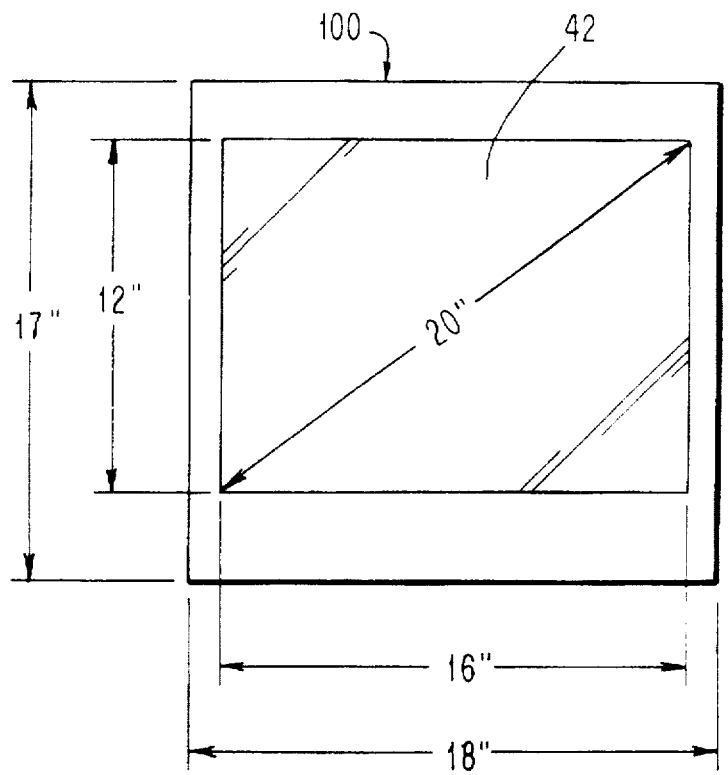
FIG. 4 shows a front view of a projection display according to one embodiment of the present invention.

FIG. 4 shows a front view of a display 100 according to one embodiment of the present invention, having a size of 18 by 17 inches for example. The display 100 includes a screen 42 having a size of approximately 16 by 12 inches, for example, i.e., an approximately 4×3 aspect ratio, with a diagonal of approximately 20 inches.

Figure 5:
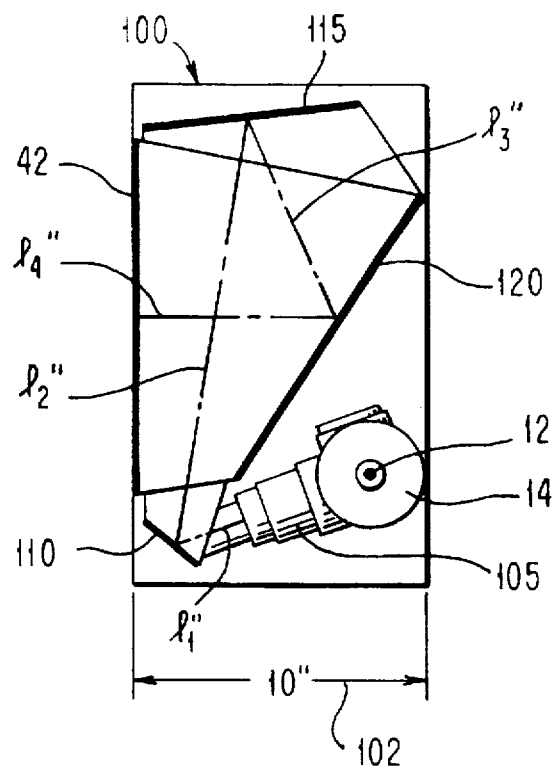
FIG. 5 shows a side view of the projection display of FIG. 4 according to the present invention.

As shown in FIG. 5, the thickness or depth 102 of the display 100 is approximately half the screen diagonal, resulting in a depth 102 of approximately 10 inches or less, for example. Additional advantages of the inventive display includes a projection lens 105 having a longer throw and a narrow illumination angle, greater intensity uniformity of the projected image on the screen 42, and lower distortion.

FIG. 5 shows a side view of the display 100. The display 100 has a projection lens 105 for projecting an image onto the screen 42 through an arrangement of three folding reflective surfaces, which are mirrors for example. The image is projected from the projection lens 105 to a first mirror 110, which reflects the image to a second mirror 115. The image received from the first mirror 110 is reflected by the second mirror 115 to a third mirror 120, which in turn reflects the image onto the screen 42.

The central axes of the projected image, along the optical path from the projection lens 105 to the screen 42, are shown by dashed lines having lengths $l_1"$, $l_2"$, $l_3"$ and $l_4"$. The length of the image central optical axis between the projection lens 105 and the first mirror 110 is $l_1"$; the length of the image central optical axis between the first mirror 110 and the second mirror 110 is $l_2"$; the length of the image central optical axis between the second mirror 115 and the third mirror 120 is $l_3"$; and the length of the image central optical axis between the third mirror 120 and the screen 42 is $l_4"$.

In the embodiment shown in FIG. 5, the three folding mirrors 110, 115, 120 are tilted in only one dimension. In this configuration, the central optical paths or axes $l_2"$, $l_2"$, $l_3"$, $l_4"$ of the light or image projected from the projection lens 105 to the screen 42, through the three folding mirrors 110, 115, 120, are maintained in one plane.

In this illustrative example of a 20" screen diagonal (12"×16"), where the thickness or depth of the display 100 is less than 10", the lens-to-screen distance is approximately 800 mm. The lens-to-screen distance is commonly referred to as a lens throw distance. The lens-to-screen distance or lens throw distance is the sum of the lengths of the central optical axes $l_1"$, $l_2"$, $l_3"$, and $l_4"$.

Figure 1:
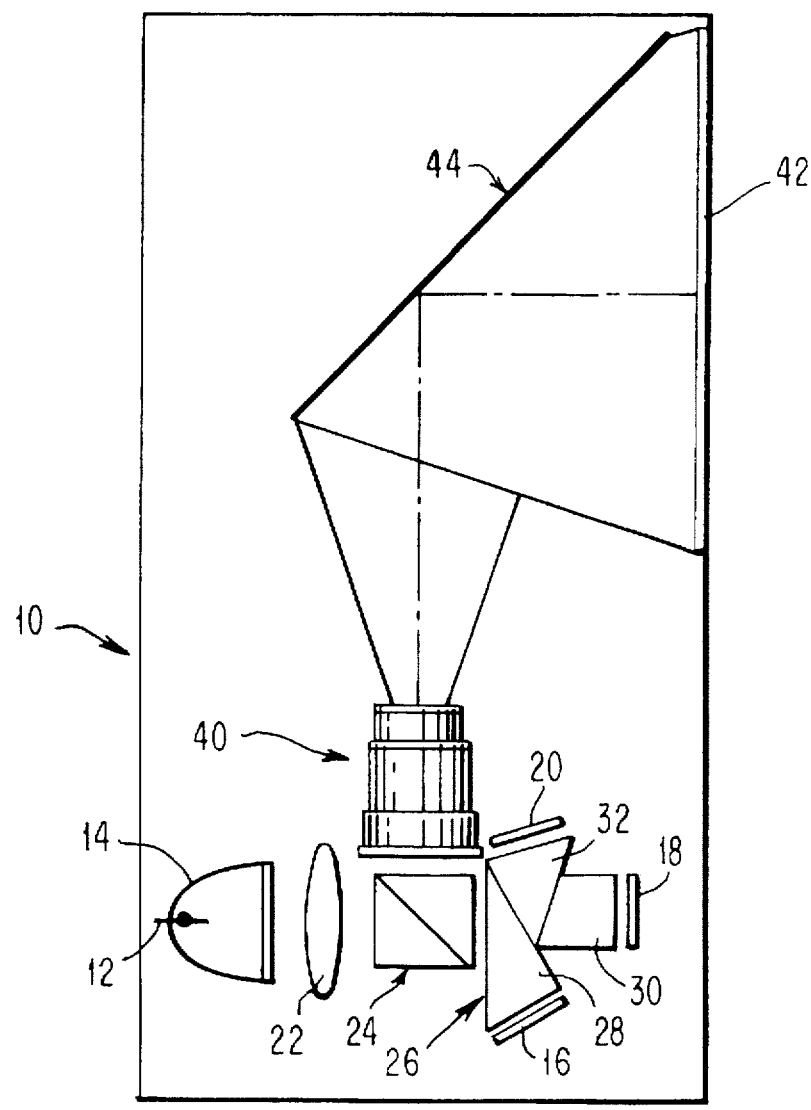
FIG. 1 shows a conventional folded liquid crystal projection display.

FIG. 5 also shows the remainder of the optics associated with the projection system 100 as discussed in greater detail in connection with FIG. 1. All the optical elements are fully enclosed within the 10", depth of the display 100. In FIG. 5, the arc lamp 12 and parabolic reflector 14 are shown.

Figure 6:
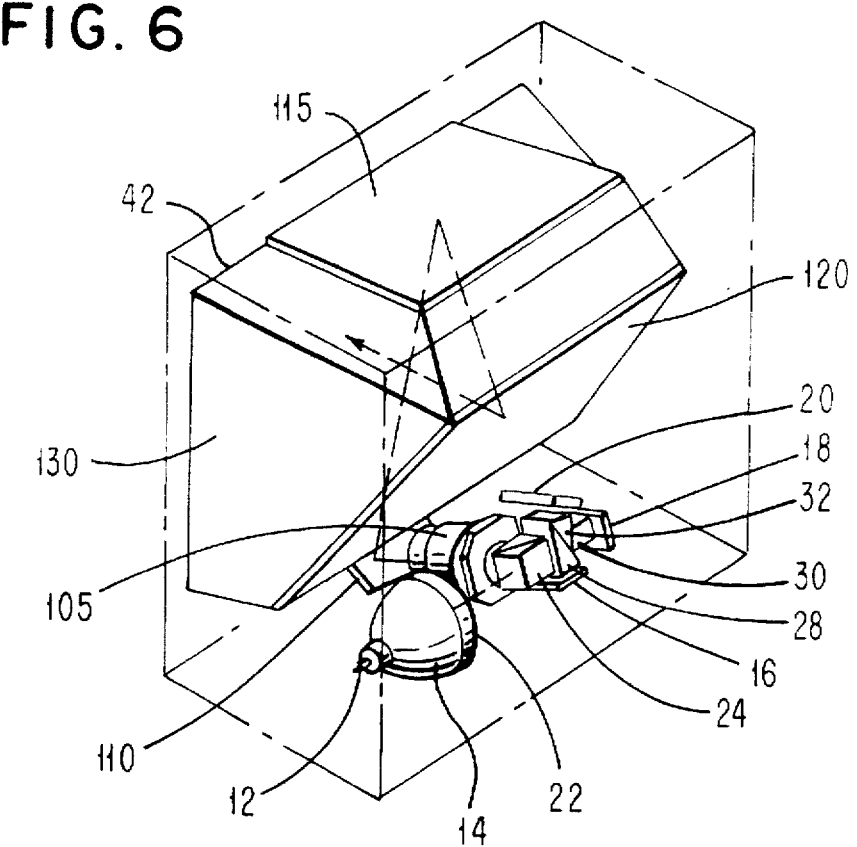
FIG. 6 shows an isometric back view of the display of FIG. 4 according to the present invention.

The optical elements are further shown in FIG. 6, which is an isometric back view of the display 100. In particular, the remaining optics shown in FIG. 6 include the condenser lens 22 located between the arc lamp 12, having a parabolic reflector 14, and a polarizing beam splitter (PBS) 24. The three reflective liquid crystal light valves 16, 18, 20 receive the light emerging from the PBS 24 through the prism assembly 26 (FIG. 1) that includes three dichroic prisms 28, 30, 32. The light valves may also be liquid crystal transmissive light valves. As described in connection with FIG. 1, the three dichroic prisms 28, 30, 32 separate light into desired colors, e.g., red, green and blue, and direct each color component to a respective one of the light valves 16, 18, 20.

Application of a voltage to the light valves 16, 18, 20 causes a rotation of polarization for ultimately forming an image on the screen 42. The rotated color components of light reflected from the light valves 16, 18, 20 enter the prism assembly 26 (FIG. 1). Upon reflection from the respective dichroic prisms 28, 30, 32, the color components recombine to constitute "white" light and traverse through the PBS 24. The PBS 24 directs one polarization of light that constitutes the image to the projection lens 105 for projection onto the screen 42 through the three folding mirrors 110, 115, 120.

Figure 2:
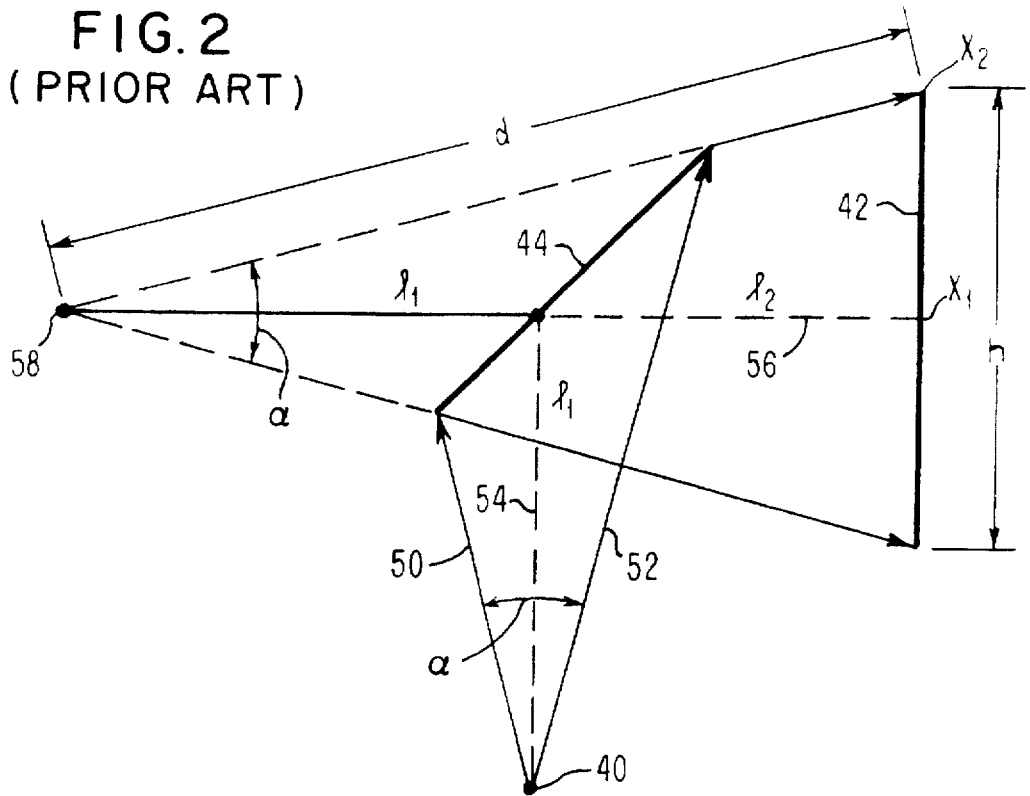
FIG. 2 shows the path of projected light between a projection lens and a screen of the conventional projection display shown in FIG. 1.
Figure 3:
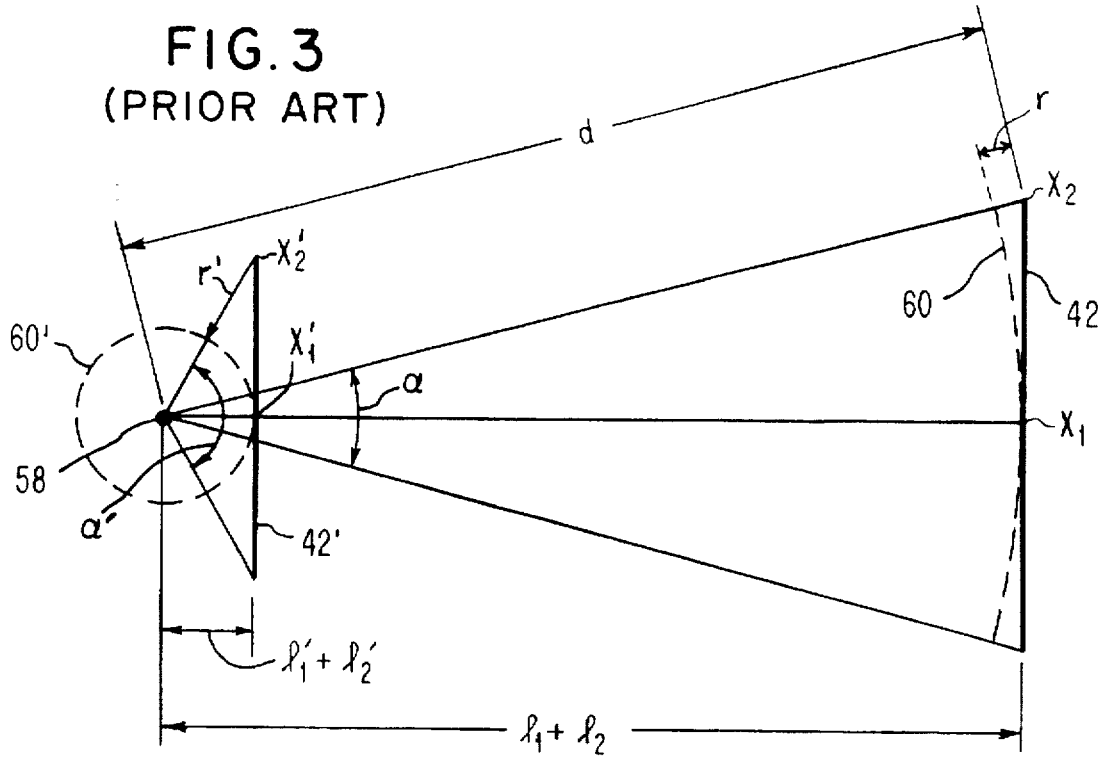
FIG. 3 shows the effect of reducing the thickness of the conventional projection display shown in FIG. 1.
Figure 7:
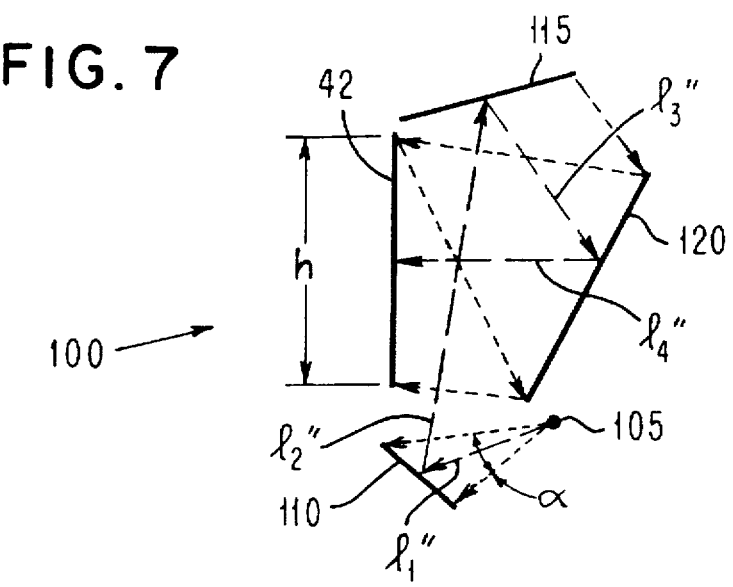
FIG. 7 shows the path of projected light between a projection lens and a screen of the display of FIG. 4 according to the present invention.

FIG. 7 shows the path of projected light between the projection lens 105, shown as a point source, and the screen 42 of the display 100. In comparison with FIG. 2, the throw distance $l_1"+l_2"+l_3"+l_4"$ of FIG. 7 equals the throw distance $l_1+l_2$ of FIG. 2. In addition, the angle α of FIG. 7 equals the angle α of FIG. 2. However, the folding mirror structure of FIG. 7 reduces the depth or thickness of the projection display 100.

The 800 mm lens throw distance yields a maximum screen (corner) illumination angle α of less than 18°. Illustratively, the illumination angle α is about 16°. The narrow angular distribution produces uniform intensity distribution on the screen 42 of the display 100. In contrast, to maintain a compact configuration in the conventional display 10 shown in FIG. 1, a lens throw distance of approximately 400 mm is required to yield a display having a 10" depth. The 400 mm distance of the conventional display 10 yields a screen illumination angle α of greater than 32°, which produces a large intensity gradient from the center of the screen to the edges thereof. In addition, it is costly and complex to design and manufacture the short throw distance projection lens for the compact conventional display, where the lens throw distance is 400 mm, which is less than the 800 mm lens throw distance of the inventive display 100.

Figure 8:
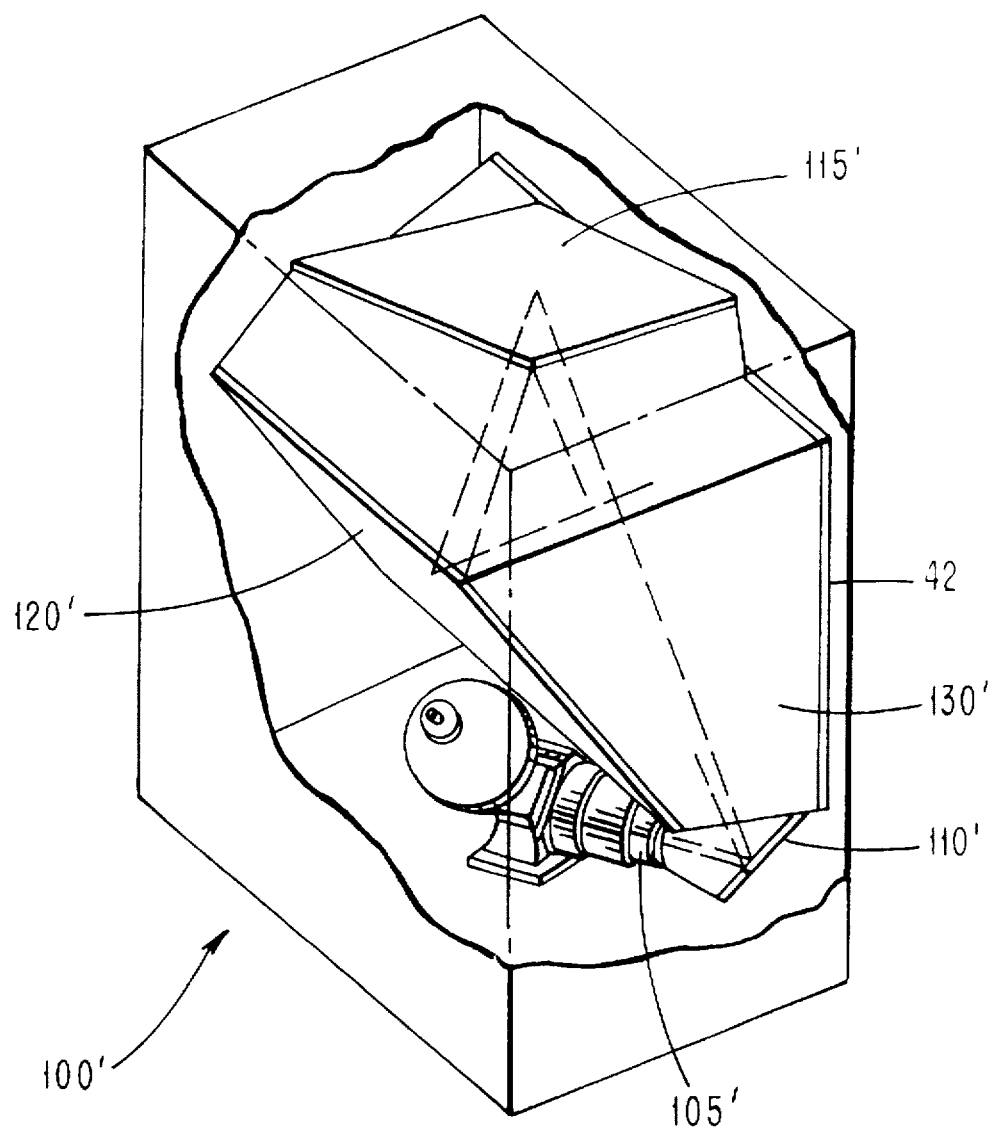
FIG. 8 shows an isometric back view of a display according to another embodiment of the present invention.

FIG. 8 shows a display 100' according to another embodiment of the present invention. The display 100' has an optical configuration similar to that of display 100 shown in FIG. 6, except that the folding mirrors are skewed relative to each other. In this embodiment, the central optical axes of the image projected from the projection lens 105' onto the screen 42, through the skewed mirrors 105', 115', 120', shown as dashed lines, are not in a single plane. The central optical axes do not lie in a common plane.

By skewing the mirrors 105', 115', 120', and reflecting the optical path out of a single plane, the lens throw distance is further increased with minimal impact on the depth of the optical package. Using the same screen dimensions as the display 100 shown in FIG. 4, the lens throw distance of the projection lens 105' increases to approximately 900 mm, yielding a maximum projection angle of only about 14.6°.

The three mirrors of the display 100 or 100' may be enclosed in a separate projection compartment that is isolated from the environment. The isolated compartment is referenced by numeral 130 in FIG. 6, and numeral 130' in the skewed mirror embodiment of FIG. 8. The projection compartment (from the projection lens to the screen) is sealed to provide a light-tight, dust-tight, dust free, and thermally isolated environment.

In both embodiments of FIGS. 6 and 8, additional folding mirrors may also be included outside the three-mirror compartment 130 (130'). The additional mirrors may also be enclosed in another environmentally isolated compartment. A further environmentally isolated compartment may also be provided to accommodate the remainder of the optical assembly.

In a further embodiment, the first mirror 110 of FIG. 5 (or 110' of FIG. 8) is dispensed with, and the projection lens 105 (105') is placed in the location of the dispensed mirror 110 (110'). This results in a display having two folding mirrors.

The inventive display makes an efficient use of the projection space. The mirror configurations shown in FIGS. 5 and 8 use the projection space in a double pass. The optical axes comprising $l_1"+l_2"+l_3"+l_4"$ crosses or nearly crosses itself. The mirror configurations shown in FIGS. 5 and 8 fold the projection space with the help of reflections of the imaging beam by light from the folding mirrors. The light path traverses the same space between the folding mirrors a multiple number of times. Thus, the projection space is used multiple times. This allows longer lens-to-screen projections distances in a compact arrangement.

While the invention has been particularly shown and described with respect to illustrative and preformed embodiments thereof, it will be understood by those skilled in the art that the foregoing and other changes in form and details may be made therein without departing from the spirit and scope of the invention which should be linked only by the scope of the appended claims.

Having thus described our invention, what we claim as new, and desire to secure by Letters Patent is:

1. An apparatus for displaying an image on a screen comprising:

a projection lens for projecting said image;

a first reflective surface for receiving said projected image and reflecting a first reflected image having a first central optical axis;

a second reflective surface for receiving said first reflected image and reflecting a second reflected image having a second central optical axis onto said screen; and an environmentally sealed compartment which encloses said first and second reflective surfaces;

said first and second reflective surfaces providing a folded projection path, wherein said first and second central optical axes are in a single plane.

2. The apparatus of claim 1 further comprising a third reflective surface located to receive said projected image and to reflect said projected image to said first reflective surface.

3. The apparatus of claim 1, wherein said projection lens has a narrow illumination angle.

4. An apparatus for displaying an image on a screen comprising:

a projection lens for projecting said image, said projection lens having an illumination angle which is less than 18° for a display depth of approximately 10 inches and a screen diagonal of approximately 20 inches;

a first reflective surface for receiving said projected image and reflecting a first reflected image having a first central optical axis;

a second reflective surface for receiving said first reflected image and reflecting a second reflected image having a second central optical axis onto said screen; and an environmentally sealed compartment which encloses said first and second reflective surfaces;

said first and second reflective surfaces providing a folded projection path, wherein said first and second central optical axes are in a single plane.

5. The apparatus of claim 1, wherein said projection lens has a long lens-to-screen distance relative to the display depth.

6. An apparatus for displaying an image on a screen comprising:

a projection lens for projecting said image, said projection lens having a lens-to-screen distance which is approximately from 800 mm to 900 mm for a display depth of approximately 10 inches and a screen diagonal of approximately 20 inches;

a first reflective surface for receiving said projected image and reflecting a first reflected image having a first central optical axis; and a second reflective surface for receiving said first reflected image and reflecting a second reflected image having a second central optical axis onto said screen, said first and second reflective surfaces providing a folded projection path, wherein said first and second central optical axes are in a single plane.

7. An apparatus for displaying an image on a screen comprising:

a projection lens for projecting said image;

a first reflective surface for receiving said projected image and reflecting a first reflected image having a first central optical axis; and a second reflective surface for receiving said first reflected image and reflecting a second reflected image having a second central optical axis onto said screen; and an environmentally sealed compartment which encloses said first and second reflective surfaces;

said first and second reflective surfaces providing a folded projection path, wherein said first and second central optical axes are in a single plane and a depth of said displaying apparatus is approximately less than one-half a diagonal of said screen having an aspect ratio of approximately 4 by 3.

8. The apparatus of claim 1, wherein said first and second reflective surfaces are tilted in one dimension.

9. The apparatus of claim 1, wherein said first and second reflective surfaces are folding mirrors.

10. An apparatus for displaying an image on a screen comprising:

a projection lens for projecting said image;

a first reflective surface for receiving said projected image and reflecting a first reflected image having a first central optical axis;

a second reflective surface for receiving said first reflected image and reflecting a second reflected image having a second central optical axis onto said screen; and an environmentally sealed compartment which encloses said first and second reflective surfaces;

said first and second reflective surfaces providing a folded projection path, wherein said first and second central optical axes are not in a common plane.

11. The apparatus of claim 10 further comprising a third reflective surface located to receive said projected image and to reflect said projected image to said first reflective surface.

12. The apparatus of claim 10, wherein said projection lens has a narrow illumination angle.

13. An apparatus for displaying an image on a screen comprising:

a projection lens for projecting said image, said projection lens having an illumination angle which is less than 18° for a display depth of approximately 10 inches and a screen diagonal of approximately 20 inches;

a first reflective surface for receiving said projected image and reflecting a first reflected image having a first central optical axis; and a second reflective surface for receiving said first reflected image and reflecting a second reflected image having a second central optical axis onto said screen, said first and second reflective surfaces providing a folded projection path, wherein said first and second central optical axes are not in a common plane.

14. The apparatus of claim 10, wherein said projection lens has a long lens-to-screen distance relative to the display depth.

15. An apparatus for displaying an image on a screen comprising:

a projection lens for protecting said image, said projection lens having a lens-to-screen distance which is approximately from 800 mm to 900 mm for a display depth of approximately 10 inches and a screen diagonal of approximately 20 inches;

a first reflective surface for receiving said projected image and reflecting a first reflected image having a first central optical axis; and a second reflective surface for receiving said first reflected image and reflecting a second reflected image having a second central optical axis onto said screen, said first and second reflective surfaces providing a folded projection path, wherein said first and second central optical axes are not in a common plane.

16. An apparatus a projection lens for protecting said image;
  a first reflective surface for receiving said projected image and reflecting a first reflected image having a first central optical axis; and
  a second reflective surface for receiving said first reflected image and reflecting a second reflected image having a second central optical axis onto said screen,
  said first and second reflective surfaces providing a folded projection path, wherein said first and second central optical axes are not in a common plane and a depth of said displaying apparatus is approximately less than one-half a diagonal of said screen having an aspect ratio of approximately 4 by 3.

17. The apparatus of claim 10, wherein said first and second reflective surfaces are skewed relative to each other.

18. The apparatus of claim 10, wherein said first and second reflective surfaces are folding mirrors.

19. A device for holding reflective surfaces comprising:
  an environmentally sealed optical compartment having an inlet and an outlet, said environmentally sealed optical compartment including:
  a first reflective surface for receiving a projected image from said inlet and reflecting a first reflected image; and
  a second reflective surface for receiving said first reflected image and reflecting a second reflected image onto said outlet,
  said first and second reflective surfaces providing a folded projection path so that an intensity of said second reflected image is substantially uniform from edges to a center of said outlet.

20. The device of claim 19, wherein central optical axes of said first and second reflected images are in a single plane.

21. The device of claim 19, wherein central optical axes of said first and second reflected images are not in a common plane.

22. The device of claim 19, wherein said first and second reflective surfaces are tilted in one dimension.

23. The device of claim 19, wherein said first and second reflective surfaces are skewed relative to each other.

24. The device of claim 19, wherein said first and second reflective surfaces are folding mirrors.

* * * * *

UNITED STATES PATENT AND TRADEMARK OFFICE
CERTIFICATE OF CORRECTION

PATENT NO. : 5,791,754
DATED : August 11, 1998
INVENTOR(S) : Thomas M. Cipolla, et al.

It is certified that error appears in the above-identified patent and that said Letters Patent is hereby corrected as shown below:

Column 8, line 53, Claim 15: "protecting" should read --projecting--

Signed and Sealed this

Twelfth Day of October, 1999

Attest:

Q. TODD DICKINSON

*Attesting Officer*     *Acting Commissioner of Patents and Trademarks*